(12) United States Patent
Nowicki et al.

(10) Patent No.: US 12,387,169 B2
(45) Date of Patent: Aug. 12, 2025

(54) TOUCHLESS CONFIRMATION FOR PICK AND PUT SYSTEM AND METHOD

(71) Applicant: Dematic Corp., Grand Rapids, MI (US)

(72) Inventors: Daniel J. Nowicki, Belmont, MI (US); Stephen E. Hoffman, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 515 days.

(21) Appl. No.: 17/441,728

(22) PCT Filed: Mar. 20, 2020

(86) PCT No.: PCT/IB2020/052610
§ 371 (c)(1),
(2) Date: Sep. 22, 2021

(87) PCT Pub. No.: WO2020/194154
PCT Pub. Date: Oct. 1, 2020

(65) Prior Publication Data
US 2022/0164771 A1    May 26, 2022

Related U.S. Application Data (60) Provisional application No. 62/825,415, filed on Mar. 28, 2019.

(51) Int. Cl.
*G06Q 10/0836* (2023.01)
*G01S 17/894* (2020.01)
(Continued)

(52) U.S. Cl.
CPC ........ *G06Q 10/0836* (2013.01); *G01S 17/894* (2020.01); *G06F 3/017* (2013.01); *G06V 40/28* (2022.01)

(58) Field of Classification Search
CPC ... G06Q 10/0836; G01S 17/894; G06F 3/017; G06V 40/28
See application file for complete search history.

(56) References Cited

U.S. PATENT DOCUMENTS 10,040,628 B1 * 8/2018 Misra ..................... G06Q 10/08
10,810,715 B2 * 10/2020 Chamberlin ......... H04N 13/204
(Continued)

FOREIGN PATENT DOCUMENTS

DE    102015211761 A1    12/2016
DE    102016005691 A1    11/2017
(Continued)

OTHER PUBLICATIONS

Search Report from corresponding European Patent Application No. 20778095, indicated completed on May 17, 2022.
(Continued)

*Primary Examiner* — Mohamed Barakat
(74) *Attorney, Agent, or Firm* — Gardner, Linn, Burkhart & Ondersma LLP (57) ABSTRACT

A confirmation system including a touchless sensor and method for confirming that an order fulfilment operation has been performed. The system includes at least one touchless sensor to sense or recognize a gesture given by an operator, wherein the gesture confirms that a desired operation has been performed. The touchless sensor is connected to a workflow control system configured to transmit order fulfilment information to and from the touchless sensor. The touchless sensor is configurable to recognize a plurality of gestures, and may be configured to recognize those gestures at a plurality of distances away from the touchless sensor. The touchless system is configurable to provide alerts to operators to indicate locations requiring action. The confirmation system may be provided with a cubby or bin order fulfilment system. Additional features include placement or
(Continued)

retrieval sensors, cubby illumination lights, pick-to and put-to lights, and information scanners.

30 Claims, 5 Drawing Sheets

(51) Int. Cl.
    *G06F 3/01*         (2006.01)
    *G06V 40/20*     (2022.01)

(56) References Cited

U.S. PATENT DOCUMENTS

| | | | |
|---|---|---|---|
| 2008/0121168 A1* | 5/2008 | Ryznar | G05B 19/41805 |
| | | | 116/202 |
| 2011/0291988 A1* | 12/2011 | Bamji | G06F 3/0421 |
| | | | 345/175 |
| 2014/0083058 A1 | 3/2014 | Issing et al. | |
| 2015/0039458 A1* | 2/2015 | Reid | A61B 5/117 |
| | | | 705/26.1 |
| 2018/0136735 A1 | 5/2018 | Pothier | |
| 2019/0079589 A1* | 3/2019 | Spalla | G06F 3/0485 |
| 2019/0102043 A1* | 4/2019 | Lee | G06F 3/03 |
| 2021/0158319 A1* | 5/2021 | Drago | G07F 11/62 |

FOREIGN PATENT DOCUMENTS

| | | |
|---|---|---|
| JP | 2015509241 A | 3/2015 |
| JP | 2018158836 A | 10/2018 |
| KR | 20180028267 A | 3/2018 |
| WO | 2012123033 A1 | 9/2012 |
| WO | 2014028959 A1 | 2/2014 |
| WO | 2017200235 A1 | 11/2017 |

OTHER PUBLICATIONS

International Search Report and Written Opinion of the International Searching Authority from corresponding Patent Cooperation Treaty (PCT) Application No. PCT/IB2020/052610, indicated completed on Jun. 15, 2020.

* cited by examiner

TOUCHLESS CONFIRMATION FOR PICK AND PUT SYSTEM AND METHOD

CROSS-REFERENCE TO RELATED APPLICATIONS

The present application claims priority benefits of International Patent application No. PCT/IB2020/052610, filed Mar. 20, 2020, and claims the filing benefits of U.S. provisional application, Ser. No. 62/825,415, filed Mar. 28, 2019, which are each hereby incorporated by reference herein in their entireties.

FIELD OF THE INVENTION

The present invention is directed to picking systems and more particularly to a touchless confirmation system for pick or put order fulfilment systems.

BACKGROUND OF THE INVENTION

Distribution centers typically utilize order picking systems for the purpose of assembling their customer's orders. In modern distribution centers, order picking has been made paperless, at least to the person manually picking orders. A modern paperless picking system has numerous advantages; it allows the picker to use both hands, is more accurate, tracks productivity and generates reports, maintains products statistic, offers accountability and improves inventory management. Paperless picking systems may, for example, revolve around a central system controller (computer) which interfaces with a customer's host computer, one or more monitors and a series of "second level devices" or section controllers which manage picking zone level activities. The section controllers in turn, control picking bay level and picking slot or location level devices. Each pick location or slot is identified by one of a family of devices which are positioned throughout the picking area giving order information to the pickers and providing an interface for peripheral devices such as scanners. Zone level information is transmitted to the picker and received from the picker by any number of electronic devices.

Zone and location level devices are generally capable of displaying pick data, acquiring pick confirmation data, displaying quantity adjustment and quantity recall, or other functions which may be relevant to the order picking job at hand. Location level devices often include physical confirmation devices, such as a button, to be activated by an operator to acknowledge that a specific operation has been successfully completed. Operators often interact with physical confirmation devices hundreds and thousands of times a day, which can lead to fatigue for the operator known as "button fatigue".

Throughput is a common metric used in the distribution industry, measuring the quantity of items picked or placed in a unit of time. Physical interaction with confirmation devices like buttons over thousands of interactions a day decrease overall throughput by increasing the amount of time it takes to complete each individual operation. Throughput is further decreased by an operator having to determine a specific location to which an item or object is to be placed or where an item needs to be removed, based on information provided to the operator. The operator may receive location information physically or via visual alerts. Throughput is increased by decreasing the amount of time necessary for an operator to locate the proper location for the required operation.

SUMMARY OF THE INVENTION

A confirmation system, according to an aspect of the invention, includes a touchless confirmation sensor that is configured to recognize a gesture from an operator such that the gesture indicates that a desired action or operation, such as removing an item from a bin, has been successfully completed. In one aspect, the touchless confirmation sensor is in electronic communication with a workflow control system or an order fulfilment management system such that the workflow control system is capable of sending instructions to complete a desired operation to the confirmation system or to an operator and the workflow control system is capable of receiving an acknowledgement signal from the touchless confirmation sensor that the desired operation has been completed. The gesture actuated sensor removes the need for an operator to physically contact a confirmation device, such as a confirmation button. The touchless confirmation sensor provides reduced wear of components, reduced contamination of sterile or fresh food items, and reduced "button fatigue" for the operator.

In one aspect of the invention, the confirmation system includes a touchless confirmation sensor disposed in a housing along with a processor, wherein the processor and the touchless confirmation sensor are in electronic communication with a workflow control system. The touchless confirmation sensor is operable to sense a confirmation gesture from an operator and to communicate receipt of the gesture to the processor, wherein the processor communicates the confirmation to the workflow control system. The touchless confirmation sensor may be an optical sensor, a photo sensor, a radar sensor, a proximity sensor, a time of flight sensor, an infrared sensor, or the like.

In another aspect, the processor is capable of receiving an instruction from the workflow control system to indicate to an operator that an action is required proximate to that sensor, such as to illuminate a light disposed with the touchless confirmation sensor. Once the processor communicates that the operation is complete to the workflow control system, the processor sends a signal to the light to turn off, to indicate that no further action is required proximate to that sensor. Preferably, a confirmation alert, such as illumination of an additional light, or a different color light, is provided to confirm to the operator that the processor recognized that the operation was successfully completed.

According to one aspect of the invention, the touchless confirmation sensor is configured to recognize a plurality of gestures performed proximate the sensor. Examples of recognizable gestures include cover, push, pull, swipe up, swipe down, swipe left, swipe right, or the like. In another aspect, the touchless sensor is capable of recognizing gestures performed at a specific distance from the proximate the sensor, such as with utilization of a Time of Flight (ToF) sensor. The specific distance is configurable to desired distances to allow for "windowing" or areas defining acceptable locations for a specific gesture to be performed.

Optionally, the touchless confirmation sensor includes a placement and retrieval sensor configured to recognize that an item has been placed in or removed from a specified location. The placement and retrieval sensor may be an optical sensor, such as a camera, a barcode scanner, or the like.

The touchless confirmation sensor, according to one aspect, includes an illumination source electronically coupled to the processor and configured to illuminate a desired workspace, such as a cubby or a bin. The illumination source may include a plurality of light emitting diodes to provide a plurality of colors to illuminate the workspace in visually distinguishable colors. The illumination source is operable to indicate a desired workspace that requires action or attention from the operator, such as to indicate that an item in the illuminated workspace needs to be removed included an order. The processor is capable of sending a signal to the illumination source based information received form the workflow control system to illuminate a desired workspace.

Optionally, in one aspect, a physical confirmation button is coupled with the confirmation system to provide an additional means for an operator to confirm that an operation has been completed. In another aspect, an information scanning unit is provided with the confirmation system and is configured to scan, read, identify, or sense identifying information disposed with an item, such as a barcode, an RFID tag, a QR code or the like, such that the workflow system can track inventory quantities of specific items.

According to another aspect of the invention, a method for confirming the completion of an order fulfilment operation includes receiving an instruction from a workflow control system or an order fulfilment management system to perform an order fulfilment operation including a touchless confirmation sensor configured to confirm the completion of the operation. The touchless confirmation sensor is disposed proximate to an order fulfilment station or a workspace of a warehouse and is in electronic communication with the workflow control system. The touchless confirmation sensor is configured to recognize at least one physical gesture performed by an operator proximate the sensor. Once the operator has completed the desired operation, the operator provides the gesture proximate to the sensor confirming that the operation is complete. The workflow control system receives the gesture and confirmation that the operation has been completed.

In one aspect of the invention, the confirmation system is configured to be disposed with a paperless order fulfillment, such as a pick-to light rail. The paperless order fulfilment provides a removable and replaceable interface between the confirmation system and the workflow control system.

Therefore, the present invention provides a touchless system and method for confirming that a desired operation has been performed. The touchless system including at least one touchless sensor configured to sense or receive a gesture given by an operator to confirm that the desired operation has been performed. The touchless sensor is configured to recognize a plurality of gestures, such as swiping side to side, and to recognize those gestures at a plurality of distances away from the sensor at areas defining gesture windows wherein a specific gesture in the window will confirm completion of a specific operation. Optionally, the touchless system includes placement or retrieval sensors, cubby illumination lights, pick-to and put-to lights, and information scanners.

These and other objects, advantages, purposes, and features of the present invention will become more apparent upon review of the following specification in conjunction with the drawings.

DESCRIPTION OF THE PREFERRED EMBODIMENTS

Referring now to the drawings and the illustrative embodiments depicted therein, in various embodiments a touchless confirmation system for order consolidation includes a sensor configured to recognize movement of an object, a person, or a person's appendage in order to recognize if a specific movement or action has occurred. The touchless confirmation system is configurable to recognize gestures from an operator and to communicate information based on the gesture to a central processor or to an operator. The touchless confirmation system is configured to receive information from a workflow system to aid an operator or user in order processing or consolidation. The touchless confirmation system is further configured to communicate that information to a user, such as alerts to pick an item from a specific location, an alert or acknowledgement that the item has been picked, an alert to place an item in a specific location, and additional alerts or notifications. The touchless confirmation system eliminates the need for an operator to press a button to confirm a specific action has taken place, thus eliminating "button fatigue" that is experienced from repetitive physical pressing of a button. Eliminating the button pressing action decreases time for processing an order and thereby increases productivity and throughput. Additionally, continuous use of push button confirmation systems reduce the life cycle of the system due to wear over time. The touchless confirmation system is configurable for use as a "pick to light" or "put to light" for order processing or order consolidation operations. An additional advantage of the touchless confirmation system is that in fresh food handling or in clean room environments, the touchless confirmation system eliminates potential contamination by removing the physical button push required in a button confirmation system. The touchless confirmation system is configurable to operate with small cubbies, with large bins, with warehouse shelves, with large containers, with shipping containers, as well as other types of distribution systems and units.

Figure 1:
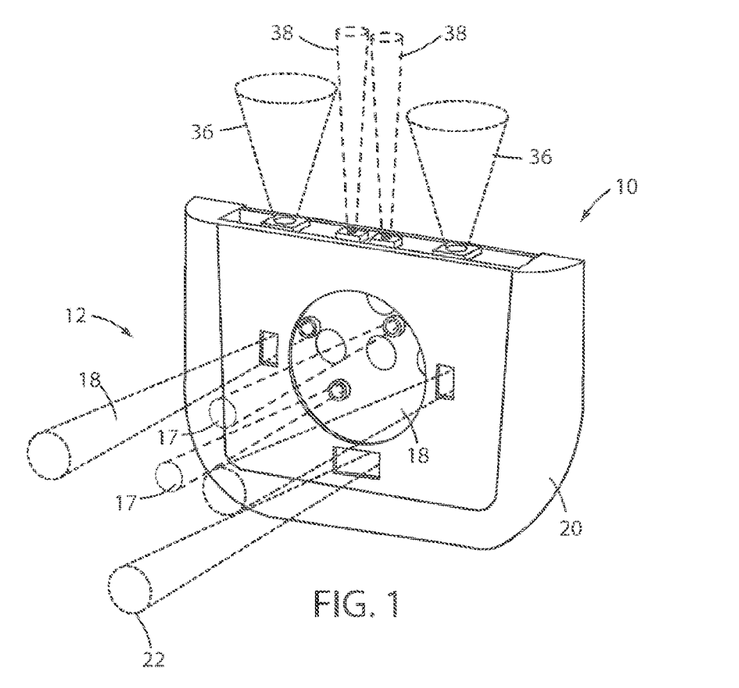
FIG. 1 is a perspective view of a touchless confirmation system in accordance with the present invention.
Figure 2:
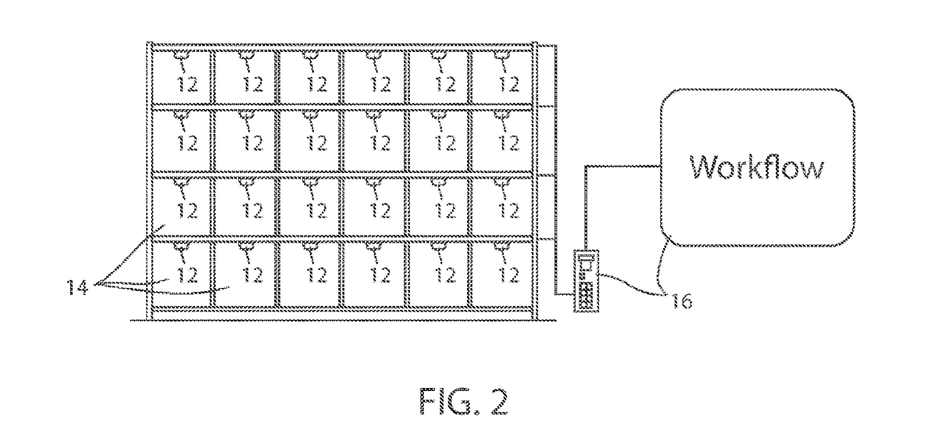
FIG. 2 is a front-elevation view of a cubby system utilizing the touchless confirmation system of FIG. 1.
Figure 3:
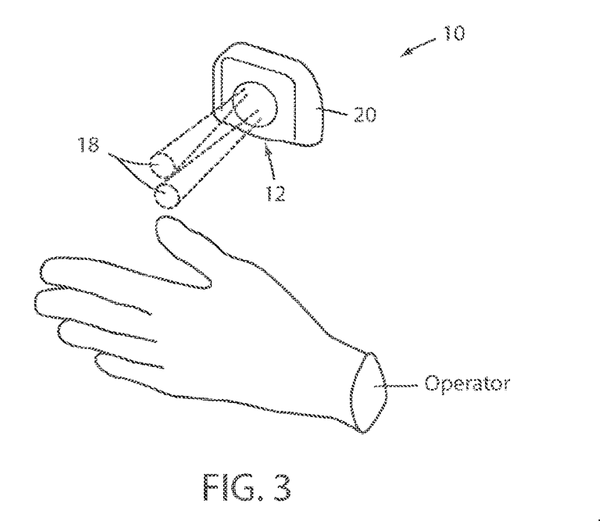
FIG. 3 is a perspective view of the touchless confirmation system of FIG. 1, depicting an operator interacting with the system.

As shown in the illustrated embodiment of FIG. 1, a touchless confirmation system 10 is provided that includes a touchless confirmation sensor 12 configured to recognize a movement of an object or a movement from an operator to allow the operator to confirm an operation has been completed without physically pressing a button. The touchless confirmation sensor 12, as illustrated in FIG. 1 includes a plurality of sensors 18, 22, 36 disposed in a housing 20. Each sensor 18, 22, 36 is configured to recognize that an operator has performed a specific task, such as removing an item from a warehouse location, an order management system, a cubby 14, a bin, a pick location, a slot, or the like (FIG. 2). While the confirmation system 10 of FIG. 1 illustrates multiple sensors 18, 22, and 36 of the confirmation sensor 12, in alternative embodiments, the confirmation sensor 12 may include only one type of sensor to recognize the confirming movement. The confirmation sensor 12 may include a photo sensor, a radar sensor, a proximity sensor, a time of flight sensor, an infrared sensor, an electronic sensor, a photo-electric sensor, or other acceptable sensor configured to recognize a movement or gesture. The confirmation sensor 12 may utilize a commercially available sensor or may utilize a proprietary sensor apparatus. Examples of commercially available sensors that may be incorporated include the Telemecanique XUPK2PANJ45 photo-electric sensor and Telemecanique inductive proximity sensors "OsiSense XS".

Figure 9:
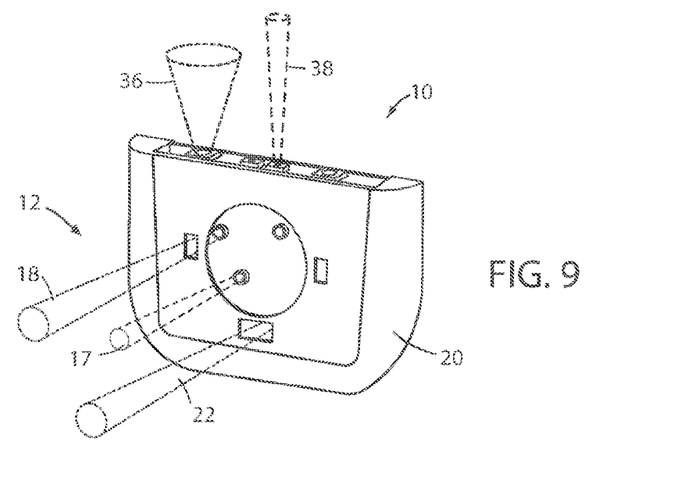
FIG. 9 is a perspective view of the touchless confirmation system of FIG. 1, depicting simultaneous function of a placement and removal sensor, a cubby illumination light, a gesture sensor, and a time of flight sensor, in accordance with the present invention.

In the illustrated embodiment of FIG. 2, a plurality of cubbies or bins 14 are provided in electronic communication with a workflow processing system 16 (FIG. 2). Each cubby 14 includes a touchless confirmation sensor 12 disposed at the cubby 14. The touchless confirmation sensor 12 at each cubby 14 is configured to direct an operator to remove an item from a specific cubby 14 as communicated to the operator from the workflow system 16 and to receive confirmation of the removal of the item by receiving a gesture from the operator (e.g. waving, signaling, or gesturing) proximate to the confirmation sensor 12. Once the operator has confirmed the operation the confirmation sensor 12 communicates to the workflow system 16 that the operation has been completed. Optionally, the touchless confirmation sensor 12 includes a processor (not shown) coupled with the confirmation sensor 12 to communicate either directly to the workflow system 16 or directly to the operator through an alert or positive acknowledgement, such as a signal light 17 to acknowledge that the desired operation was successfully performed (FIGS. 1 and 9). The signal light 17 is configurable to alert the operator that an action or operation is required proximate to the signal light 17, such as that an item needs to be retrieved from a cubby 14 assigned to the touchless confirmation system including the illuminated signal light 17.

Figure 4A:
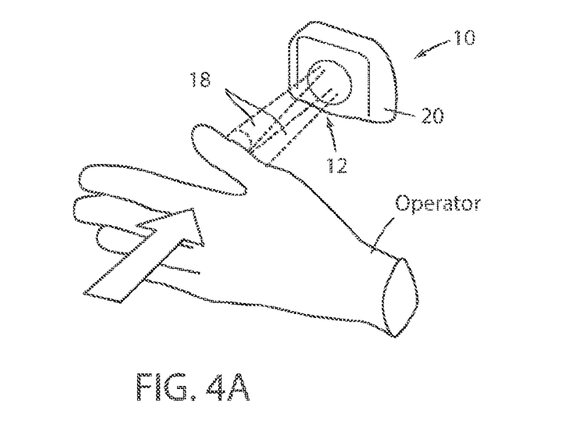
FIGS. 4A-4D are perspective views of the touchless confirmation system of FIG. 1, each depicting an operator providing a different one of various directional hand gestures to the touchless confirmation system of FIG. 1, in accordance with the present invention.
Figure 4B:
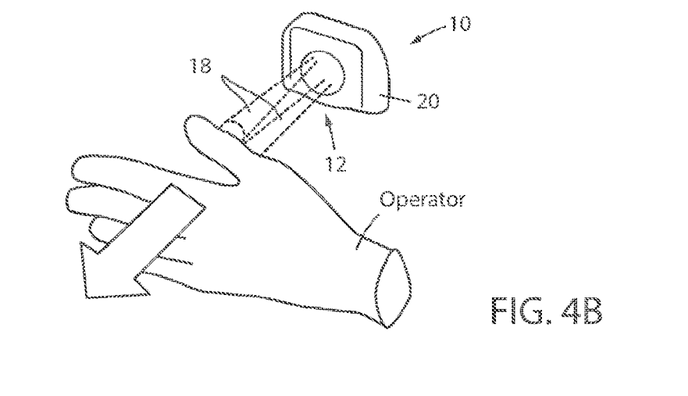
Figure 4C:
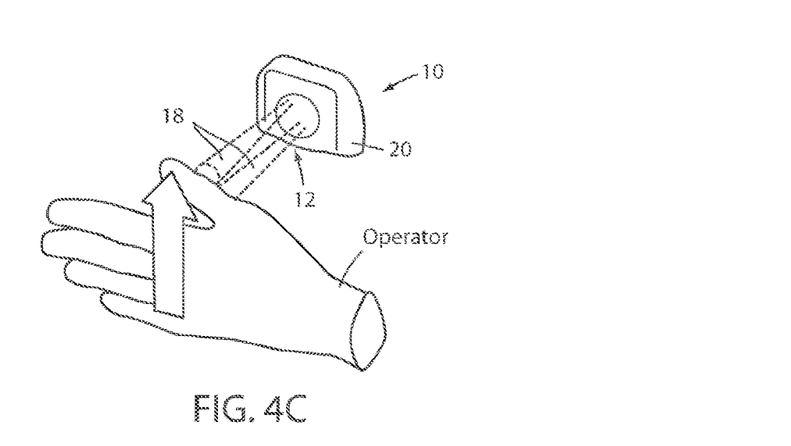
Figure 4D:
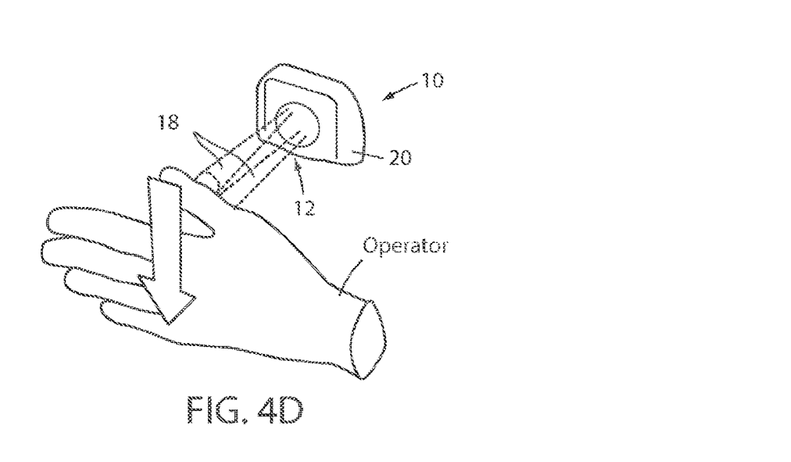

As illustrated in FIGS. 1 and 3-4D, the touchless confirmation sensor 12 includes a gesture sensor 18 disposed in the housing 20 in electronic communication with a processor (not shown) that is also disposed in the housing 20. The processor and gesture sensor 18 coordinate to recognize a gesture performed by the operator proximate the gesture sensor 18. The gesture sensor 18 is configurable to recognize a plurality of gestures to be performed by an operator. Examples of gestures include: "cover" wherein the operator places their hand in front of the sensor 18 (no shown); "push" wherein the operator moves their hand toward the sensor 18 (FIG. 4A); "pull" wherein the operator, with their hand proximate the sensor 18, moves their hand away from the sensor 18 (FIG. 4B); "swipe up" wherein the operator swipes their hand upward from below the sensor 18 (FIG. 4C); "swipe down" wherein the operator swipes their hand downward from below the sensor 18 (FIG. 4D); "swipe left" wherein the operator swipes their hand sideways from the right side of the sensor 18 (not shown); and "swipe right" wherein the operator swipes their hand sideways from the left side of the sensor 18 (not shown).

Figure 5:
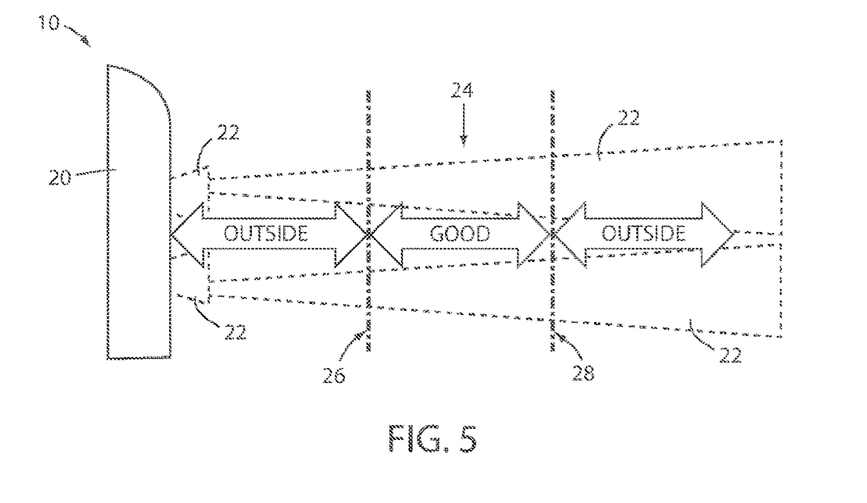
FIG. 5 is a side view and schematic of the touchless confirmation system of FIG. 1 depicting a gesture distance configuration for "windowing" functionality.
Figure 6:
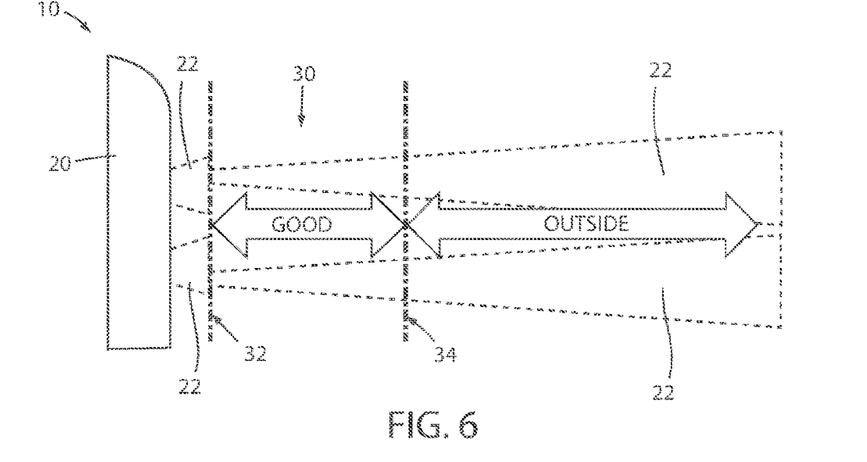
FIG. 6 is a side view and schematic of the touchless confirmation system of FIG. 1 depicting another gesture distance configuration for "windowing" functionality.

As illustrated in FIGS. 5 and 6, the time of flight (ToF) sensor 22 is disposed in the housing 20 and the ToF sensor 22 is in electronic communication with the processor. The ToF sensor 22 is configured to recognize a gesture performed by the operator proximate the ToF sensor 22 by repeatedly measuring distance to an object (operator's hand) in order to track its movement. The ToF sensor 22 is configurable to recognize a plurality of gestures to be performed by an operator. The ToF sensor 22 may be configured to recognize similar gestures as described previously, including cover, push, pull, swipe up, swipe down, swipe left, and swipe right.

In the preferred embodiment, the ToF sensor 22 is configured to sense or recognize gestures performed at a specific distance, enabling the touchless confirmation system 10 to perform "windowing" functions. As illustrated in FIGS. 5 and 6, windowing functions are configurable to recognize or accept a specific gesture performed in a pre-determined spatial area proximate to the ToF sensor 22. One example of a windowing function is a gesture window 24 that covers an area defined by a first specified distance 26 away from the ToF sensor 22 and a second specified distance 28 away from the ToF sensor 22, as illustrated in FIG. 5. Another example of a windowing function is a gesture window 30 that covers an area starting at a first specified location 32, substantially at the ToF sensor 22, and ending at a second specified distance 34 away from the ToF sensor 22, as illustrated in FIG. 6.

Figure 7:
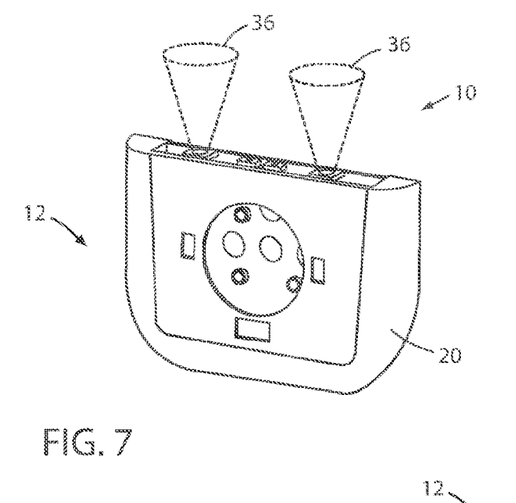
FIG. 7 is a perspective view of the touchless confirmation system of FIG. 1, depicting function of placement and removal sensors in accordance with the present invention.

As illustrated in FIGS. 1, 7, and 9, the touchless confirmation system 10 includes at least one placement and removal sensor 36 configured to sense or recognize when an object has been placed in a cubby 14 or removed from a cubby 14. The placement and removal sensor 36 is disposed on an upper portion of the housing 20, such that when the system 10 is disposed proximate a cubby 14, the placement and removal sensor 36 is near the desired location for the placement or removal of the item to which the placement or removal sensor 36 is assigned. Preferably, the placement and removal sensor 36 is configured to recognize a movement or gesture in a spatial area defined by the perimeter of the assigned cubby 14 (FIG. 2). Optionally, the placement and removal sensor 36 provides a sensor "curtain" defined by the plane of the front opening of the assigned cubby 14, such that any movement or gesture crossing the front plane of the cubby 14 is recognized or sensed and the sensor 36 communicates a positive confirmation to the workflow system 16 or to the operator that an operation has been completed. The touchless confirmation system 10 is configurable to recognize that an operator has placed an item into a desired location, to acknowledge that the operation has been completed, and then confirm that the operator placed the item in the correct position through utilization of a photo sensor (not shown) configured to recognize the presence of an object in the photo sensor's field of view.

Figure 8:
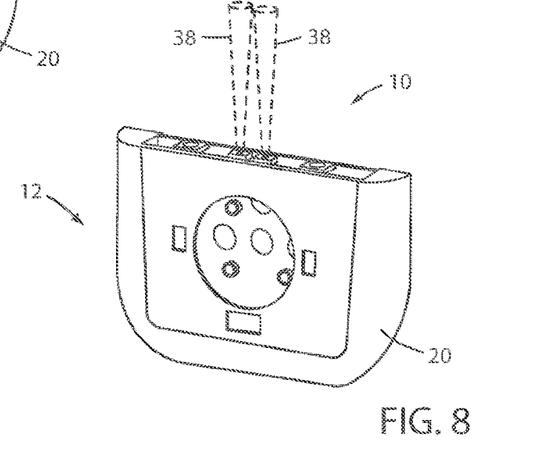
FIG. 8 is a perspective view of the touchless confirmation system of FIG. 1, depicting function of cubby illumination lights in accordance with the present invention.

The touchless confirmation system 10 includes at least one cubby illumination or light means 38, as illustrated in FIGS. 1, 8, and 9. The light 38 provides an illumination source that is operable to illuminate a cubby 14, bin, bay, or the like. Preferably the cubby illumination light 38 is in electronic communication with the workflow system 16 such that the workflow system 16 transmits a signal to the cubby illumination light 38 to illuminate a specific cubby 14 based on the object located in the cubby 14 that needs to be removed or to illuminate a specific cubby 14 to which an object needs to be placed (FIG. 2). As illustrated, the light 38 is disposed with the housing 20 and is directed toward the assigned cubby 14 such that only the assigned cubby 14 receives light from the illumination light 38. Alternatively, the illumination light 38 is disposed apart from the housing 20 and within a portion of the assigned cubby 14, wherein the illumination light 38 is in electronic communication with the touchless confirmation system 10.

As will be appreciated the touchless confirmation systems 10, as contemplated by the present invention, may be configured with only one sensor, or multiple sensors of various types. The system 10 may include only a gesture sensor 18, only a ToF sensor 22, only a placement and removal system 36, or any combination of these sensor types as desired. For example, the touchless confirmation system 10 is configurable to utilize at least one of either a gesture sensor 18 or a ToF sensor 22 in combination with a placement and removal sensor 36 and disposed with an assigned cubby 14. As another example, the touchless confirmation system 10 is configurable to utilize at least one of either a gesture sensor 18 or a ToF sensor 22 in combination with at least one cubby illumination light 38. In a another example, as illustrated in FIG. 9, the touchless confirmation system 10 includes a gesture sensor 18 and a ToF sensor 22, both in combination with a placement and removal sensor 36 and a cubby illumination light 38.

In one embodiment, the touchless confirmation system 10 is configured to operably couple with a paperless order assembly system, such as a Dematic Pick to Light Rail as disclosed in U.S. Pat. Nos. 6,544,068 and 7,322,848. Optionally, the touchless confirmation system 10 is removably and replaceably coupled with a paperless order assembly system.

The touchless confirmation system 10 may include a physical confirmation button in combination with the touchless confirmation sensor 12, such that an operator can physically press the physical button to confirm an action is completed successfully in addition to or alternate to making a gesture or movement toward the touchless confirmation sensor 12. In one embodiment, at least one confirmation light or signal light 17 is disposed with the physical confirmation button to provide an alert to the operator that an operation has been successfully completed or to signal to the operator that an action or operation is required proximate to the signal light 17 (FIGS. 1 and 9).

Optionally, the touchless confirmation system 10 includes a scanner or optical sensor (not shown) configured to recognize an ID tag, a barcode, a QR code, an RFID tag, or similar identifying information to track information and confirm completion of a specific operation. The scanner is selectively configurable to track inventory, track quantity placed or retrieved, to recognize and acknowledge placement or recovery of a unique item, as well as other operations.

Accordingly, the touchless confirmation system of the present invention provides an alert or positive confirmation to a connected workflow system or to an operator. The touchless confirmation system provides a touchless recognition of a specific gesture, action, or movement to recognize an operation has occurred and eliminate the need for an operator physically acknowledge or confirm the completion of the operation through the physical pressing of a button. The touchless confirmation system decreases operation times by eliminating the time required for the operator to press the confirmation button. Eliminating the physical button press decreases fatigue of the operator known as "button fatigue" and decreases wear on the components of the confirmation system. The touchless confirmation system can be cooperatively coupled with additional sensors or alerts, such as cubby illumination lights configured to indicate location information to an operator, pick/put-to-lights to indicate location information to an operator, placement or retrieval sensors configured to recognize if an operator has placed or removed an item from a cubby or bin, as well as other sensors that increase throughput within a distribution system.

Changes and modifications in the specifically described embodiments can be carried out without departing from the principles of the present invention, which is intended to be limited only by the scope of the appended claims, as interpreted according to the principles of patent law, including the doctrine of equivalents.

The embodiments of the invention in which an exclusive property is claimed are defined as follows:

1. A confirmation system for a cubby system of an order fulfilment facility, comprising:
   a plurality of touchless confirmation sensors, wherein a selected touchless confirmation sensor is coupled at each of a plurality of cubbies of the cubby system, each of said touchless confirmation sensors being communicatively coupled with a workflow control system, with each said touchless confirmation sensor configured to recognize a plurality of physical gestures from an operator acknowledging that an operation has been successfully completed by repeatedly measuring distances to the operator to track movement of the physical gesture; and
   wherein each touchless confirmation sensor comprises a pair of time of flight sensors with each time of flight sensor configured to repeatedly measure distances to the operator to recognize the physical gesture and, upon recognition of the physical gesture, said touchless confirmation sensor is operable to communicate a completion signal to the workflow control system.

2. The confirmation system of claim 1, further comprising a processor communicatively coupled between each said touchless confirmation sensor and the workflow control system, said processor configured to receive and send information between said sensor and the workflow control system.

3. The confirmation system of claim 2, further comprising a confirmation indication unit configured to, upon receiving said completion signal, provide a confirmation alert to the operator alerting the operator that said touchless confirmation system has recognized the completion of the operation.

4. The confirmation system of claim 3, wherein said confirmation indication unit comprises a light to provide said confirmation alert.

5. The confirmation system of claim 1, wherein each said touchless confirmation sensor comprises a housing within which said pair of time of flight sensors is disposed, and wherein a selected said housing of each said selected touchless confirmation sensor is coupled at each one of said cubbies.

6. The confirmation system of claim 1, wherein each said touchless confirmation sensor is configured to recognize a plurality of gestures performed by the operator at a plurality of distances proximate each said time of flight sensor.

7. The confirmation system of claim 6, wherein said plurality of distances define at least one window, said window defining an area in which each said touchless confirmation system is configured to recognize a defined gesture from the operator performed within said window.

8. The confirmation system of claim 1, further comprising a placement and retrieval confirmation sensor configured to determine if an item has been placed in a defined location and/or if an item has been retrieved from a defined location.

9. The confirmation system of claim 1, further comprising an illumination source in electronic communication with said workflow control system, said illumination source configured to illuminate a particular cubby of the cubby system to alert an operator to complete an operation at that cubby.

10. The confirmation system of claim 1, wherein said confirmation system is operably coupled with a paperless order assembly system comprising a pick to light rail disposed proximate a portion of each of the cubbies of the cubby system.

11. The confirmation system of claim 10, wherein said confirmation system is removably coupled with said paperless order assembly system.

12. The confirmation system of claim 1, further comprising a physical confirmation button.

13. The confirmation system of claim 1, further comprising a scanning unit operable to recognize identifying information of an item that is being manipulated by an operator.

14. A confirmation system, comprising:
a touchless confirmation sensor comprising a pair of time of flight sensors;
a processor; and
a confirmation indication light;
wherein said touchless confirmation sensor, said processor, and said confirmation indication light are communicatively coupled with a workflow control system;
wherein said confirmation system is configured to use said time of flight sensors to recognize a plurality of gestures performed by an operator proximate to said touchless confirmation sensor by repeatedly measuring distances to the operator to track movement associated with each of the gestures, said gestures comprising acknowledgment gestures acknowledging that an operation has been successfully completed;
wherein said processor is configured to send a confirmation signal to said confirmation indication light upon recognizing one of the plurality of gestures; and
wherein said confirmation indication light is configured to, upon receiving the confirmation signal, either illuminate or turn off.

15. The confirmation system of claim 14, wherein said system using said time of flight sensors is configured to recognize gestures performed by the operator at a defined distance proximate said time of flight sensor.

16. The confirmation system of claim 15, wherein said defined distance comprises at least one window, said window defining an area in which said confirmation system is configured to recognize a pre-defined acknowledgement gesture from the operator.

17. The confirmation system of claim 14, wherein said touchless confirmation sensor is operably and removably coupled with a paperless order assembly system.

18. The confirmation system of claim 14, further comprising a physical confirmation button.

19. The confirmation system of claim 14, further comprising a placement and retrieval confirmation sensor communicatively coupled with the workflow control system, and wherein said placement and retrieval confirmation sensor is configured to determine if an item has been placed in or retrieved from a defined location.

20. The confirmation system of claim 14, further comprising a workspace illumination source communicatively coupled with the workflow control system, and wherein said workspace illumination source is configured to illuminate a space proximate the touchless confirmation sensor to alert an operator that a location requires the operator to complete an operation at that location.

21. A method of confirming the completion of an order fulfilment operation, said method comprising:
receiving an instruction from a workflow control system to perform an order fulfilment operation for an item in a defined workspace of an order fulfilment station, wherein the order fulfilment station comprises a touchless confirmation sensor disposed proximate the order fulfilment station and in communication with the workflow control system, wherein said touchless confirmation sensor comprises a pair of time of flight sensors;
performing the order fulfilment operation by an operator;
gesturing by the operator proximate said touchless confirmation sensor subsequent to said performing the order fulfilment operation to indicate that the order fulfilment operation was completed, wherein said gesturing by the operator comprises at least one physical gesture;
recognizing, with said touchless confirmation sensor the at least one physical gesture performed proximate said touchless confirmation sensor by repeatedly measuring distances to the operator with the time of flight sensors to track movement of the at least one physical gesture;
communicating a recognition signal of the at least one physical gesture from the touchless confirmation sensor to the workflow control system; and
receiving the recognition signal of the at least one physical gesture at the workflow control system and confirming that the order fulfilment operation is complete.

22. The method of claim 21, wherein said touchless confirmation sensor is configured to recognize the at least one physical gesture performed at a pre-defined distance proximate the time of flight sensors.

23. The method of claim 22, wherein said pre-defined distance comprises at least one window, said window defining an area in which said touchless confirmation system is configured to recognize a pre-defined one of the at least one physical gesture performed by the operator.

24. The method of claim 21, wherein said receiving an instruction comprises illuminating a light at the defined workspace where the item is located, said illuminating a light indicating where to perform the order fulfilment operation.

25. A confirmation system for a material handling order fulfillment operation, comprising:
a touchless confirmation sensor mounted in proximity to a location at which an operator performs material handling order fulfillment operations, said touchless confirmation sensor comprising a pair of spaced apart time of flight sensors;
wherein each time of flight sensor is configured to repeatedly measure distances to the operator, and wherein said confirmation system is configured to use measurement signals from both said time of flight sensors to recognize at least one hand gesture performed by the operator proximate to said touchless confirmation sensor, said at least one hand gesture comprising a separate hand signal separate from movement by the operator to perform a work operation.

26. The confirmation system of claim 25, further comprising a processor configured to send a confirmation signal to a confirmation indication light upon recognizing the at least one hand gesture, and wherein said confirmation indication light is configured to, upon receiving the confirmation signal, either illuminate or turn off.

27. The confirmation system of claim 25, wherein said confirmation system is configured to recognize a plurality of hand gestures performed by an operator proximate to said touchless confirmation sensor, wherein each of said hand gestures comprise separate hand signals separate from movement by the operator to perform a work operation.

28. The confirmation system of claim 25, wherein said at least one hand gesture comprises an acknowledgment gesture acknowledging that an operation has been completed.

29. The confirmation system of claim 25, wherein said system using said time of flight sensors is configured to recognize the at least one hand gesture performed by the operator within a defined distance proximate said time of flight sensors.

30. The confirmation system of claim 29, wherein said defined distance comprises at least one window, said window defining an area in which said confirmation system is configured to recognize the at least one hand gesture performed by the operator.

* * * * *